March 25, 1958  M. WELLAUER  2,828,066
TURBOCOMPRESSOR PLANT
Filed June 27, 1955
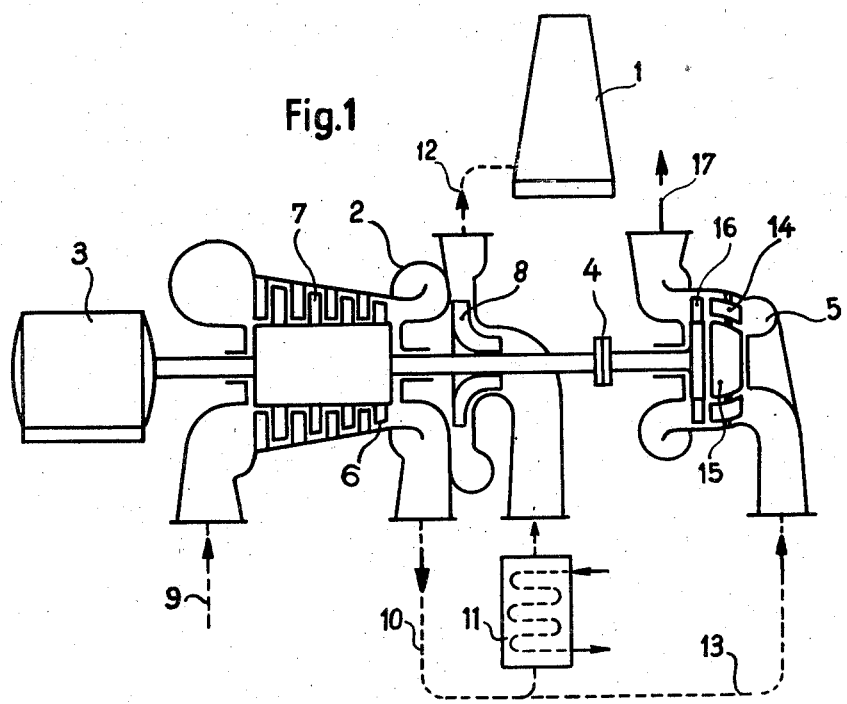
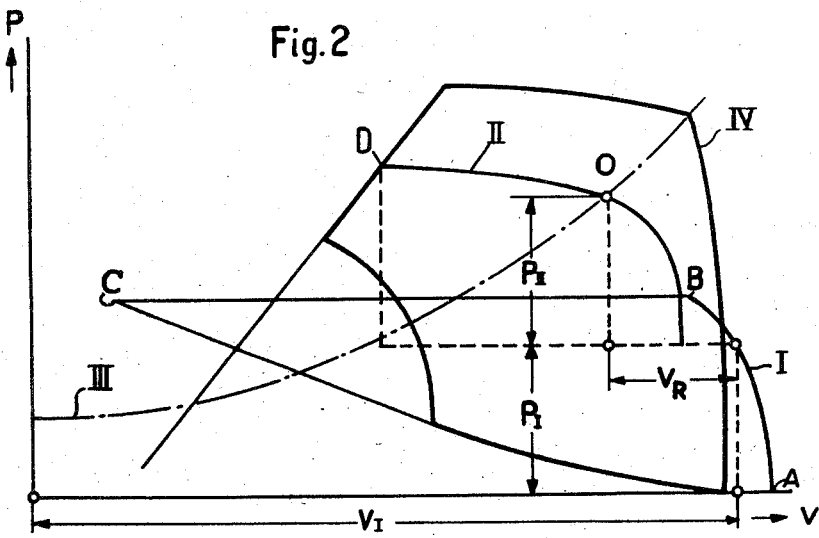
INVENTOR.
Max Wellauer.
BY
ATTORNEY.

United States Patent Office 2,828,066
Patented Mar. 25, 1958

2,828,066

TURBOCOMPRESSOR PLANT

Max Wellauer, Winterthur, Switzerland, assignor to Sulzer Frères, Société Anonyme, Winterthur, Switzerland, a corporation of Switzerland Application June 27, 1955, Serial No. 518,306

Claims priority, application Switzerland July 5, 1954

1 Claim. (Cl. 230—117)

The present invention relates to a turbocompressor plant for supplying air to metallurgical furnaces, the compressor having a plurality of stages and being driven at constant speed, for example by an electric motor.

The amount of air required by such furnaces which include, for example, basic converters and Bessemer converters, is exceedingly variable. Since the pressure drop in the furnace increases and decreases corresponding to the admitted amount of air, the pressure produced by the compressor plant must be similarly changed. A great adaptability is therefore demanded of the control of the compressor plant. In addition, the plant must furnish great amounts of air at relatively high pressures so that considerable forces must be controlled. The problem is particularly difficult because the compressor should be driven at constant speed, for example by an electric synchronous motor, excluding a speed regulation.

It is known to use recuperation turbines in combination with turbocompressors, primarily, however, for adjusting a certain output at a predetermined pressure and for simultaneously preventing pumping. In this conventional arrangement, the air for operating the recuperation turbine is taken from the last stage of the compressor. For expanding the air from the high pressure demanded by the furnace, multistage turbines must be provided. Because of the high initial expansion pressure, the recuperation force is great relative to the total power requirement of the plant.

In contradistinction to the aforedescribed conventional arrangement, a one-stage recuperation turbine having adjustable blades is used in the plant according to the invention, which turbine is supplied with air from an intermediate stage of the compressor. It is obvious that the power supplied by the recuperation turbine is much smaller in a plant according to the invention than in the conventional plants. The losses are therefore correspondingly smaller.

The control losses are further reduced because a one-stage turbine having adjustable blades, particularly a distributor including adjustable blades, affords a good operating efficiency over the whole regulating range of the turbine. In a multistage expansion turbine such a volumetric control can be effected only with a much greater loss of power because an adjustable distributor cannot be used. For example, a nozzle group regulation suitable for multistage expansion turbines has the disadvantage of efficiently operating the turbine only at small portions of the regulating range and of operating at a reduced efficiency at all other portions of the operating range.

There is a further essential advantage of the plant according to the invention: the plant cannot operate below the pumping limit during the regulation of the air supply to the metallurgical furnace. At relatively small output, the compressor operates close to the pumping limit. Since the furnace demands a relatively low air pressure at small air requirements and since the pumping limit moves into the range of smaller outputs at decreasing pressure, the overall regulating characteristic of the plant is similar to the operating characteristic of the furnace. This is particularly true if the compressor stage downstream of the stage where the air is taken for operating the turbine is constructed as a radial stage which may be followed by additional radial stages. With this construction, the pumping limit is already within the range of smaller outputs than in a compressor in which the high pressure stages are constructed as axial stages. The rather flat characteristic of a high pressure radial stage affords convenient regulation over a wide range.

The compressor stages upstream of the stage where air is diverted may be constructed as axial stages. This has the advantage that the compressor can compress larger volumes of air. The steep pressure-volume characteristic of the axial stages in the low pressure part of the compressor is very desirable because the amount of air to be expanded in the recuperation turbine is very small at reduced pressure of the air flowing to the turbine, in contradistinction to a compressor the characteristic of the low pressure part of which is flat.

The recuperation turbine preferably expands the air to the suction or admission pressure of the compressor. This is the lowest pressure in the system and affords maximum power recuperation. If the compressor receives the air, for example, from the atmosphere, the recuperation turbine may exhaust into the atmosphere or the turbine outlet may be connected with the inlet of the compressor.

The novel features which are considered characteristic of the invention are set forth with particularity in the appended claims. The invention itself, however, and additional objects and advantages thereof will best be understood from the following description of an embodiment thereof when read in connection with the accompanying drawing in which:

Figure 1 is a schematic illustration of a plant according to the invention.

Figure 2 is a diagram showing the pressure-volume characteristics of individual parts of the plant.

The plant shown in Figure 1 supplies air to a metallurgical furnace 1. A turbocompressor 2 is driven by a synchronous motor 3, if desired through a speed increasing gear, not shown. The shaft of the compressor 2 is connected by means of a clutch 4, for example, a claw clutch, with a one-stage recuperation turbine 5. The compressor has an intermediate stage 6. The compressor has axial stages 7 up to the intermediate stage, i. e., in the low pressure part, whereas a radial stage 8 (or stages) is provided in the high pressure part of the compressor. In the illustrated plant the low pressure and the high pressure part of the compressor are in a common housing. The air to be compressed enters the compressor at 9. After a primary compression in the axial stages 7, air is taken from the intermediate stage 6 and conducted through a conduit 10, indicated by a dotted line, and an intermediate cooler 11 to the radial high pressure stage 8. After further compression in the high pressure part, the air is conducted through a conduit 12 into the metallurgical furnace 1. A conduit 13 is connected to the conduit 10 before the latter terminates in the cooler 11, for diversion of a part of the air into the expansion turbine 5. The amount of diverted air can be controlled by operating the distributor 15 which is provided with adjustable blades 14. The air which is expanded in a single turbine stage 16, which contributes to the driving of the compressor 2, leaves the turbine through a conduit 17.

The regulation of the whole plant is extremely simple. It is sufficient to control the air to be expanded by means of the distributor 15 of the recuperation turbine, i. e., by adjusting the position of the blades 14. In this manner the output pressure and volume of the compressor plant are controlled at constant speed of the whole plant.

The pressure-volume characteristic, diagram Figure 2, illustrates the operation of the plant according to the invention. The pressure-volume characteristic of the low pressure part of the compressor, which is provided with axial stages, is indicated by the curve I. The pumping limit of the low pressure part is at the point "B." By cooperation with the recuperation turbine the operating range of the low pressure part is widened to extend over the line ABC. The pressure-volume characteristic curve II indicates the operation of the high pressure part of the compressor having radial stages, if the suction pressure of the high pressure stage is constant. The pumping limit of this part of the plant is indicated by point "D." Curve III illustrates the operation of the metallurgical furnace in which an increased pressure is needed for increasing air requirements. The curve III shows an assumed average. The individual values may be more to the right or to the left in Figure 2, depending on the condition of the furnace. The intersection of curves II and III defines the work point O of the entire compressor plant. The range of the regulation which can be effected by the recuperation turbine is confined by the heavy line curve IV.

If the low pressure part of the compressor compresses the air volume $V_I$, this volume can be compressed to the pressure $P_I$. The air volume $V_R$ can be conducted into the recuperation turbine and expanded therein. The characteristic II of the high pressure part of the compressor is plotted above the constant pressure $P_I$ and intersects the operating characteristic III of the furnace at the point O at the coordinates $V_I - V_R$ and $P_I + P_{II}$. Any point of the curve III within the operating range IV of the compressor can be satisfied by merely changing the amount of air $V_R$ taken into the recuperation turbine.

What is claimed is:

A turbocompressor plant comprising, in combination, an electric motor of the synchronous type, a compressor driven by said motor and having an axial flow low pressure part and a radial flow high pressure part, a bleeder conduit connected to the outlet of said low pressure part, and a single stage axial recuperation turbine connected with said bleeder conduit for receiving operating medium therefrom and being connected with said compressor for supplying driving force thereto, said turbine having adjustable guide vanes for controlling flow and direction of the operating medium into said turbine for regulating output of and the pressure produced by the plant without changing the rotational speed.

References Cited in the file of this patent

UNITED STATES PATENTS

| | | |
|---|---|---|
| 2,161,517 | Keller | June 6, 1939 |
| 2,618,470 | Brown et al. | Nov. 18, 1952 |

FOREIGN PATENTS

| | | |
|---|---|---|
| 98,943 | Sweden | Mar. 21, 1940 |
| 152,871 | Switzerland | Feb. 29, 1932 |
| 479,889 | Great Britain | Feb. 14, 1938 |
| 484,146 | Great Britain | May 2, 1938 |
| 580,458 | Great Britain | Sept. 9, 1946 |